Patented Sept. 2, 1941

2,254,956

UNITED STATES PATENT OFFICE 2,254,956

LUMINESCENT MATERIAL

Gunther Aschermann, Berlin-Charlottenburg, Germany, assignor to General Electric Company, a corporation of New York No Drawing. Application September 9, 1940, Serial No. 356,115. In Germany August 10, 1939

5 Claims. (Cl. 250—81)

My invention relates to luminescent materials in general, and more particularly to luminescent silicates for the production of light radiations within the short-wave portion, i. e., the blue and long-wave ultra-violet portion, of the spectrum.

In electric mercury-vapor tubes or lamps with a basic filling of rare gas and having thermionic activated electrodes or cold sheet-type electrodes, use is frequently made of a layer of luminescent material of activated silicates arranged within the bulb, or on the wall of the bulb, or on a screen placed in front of the discharge tube or lamp, for the purpose of increasing the light yield or for obtaining special colors of light. Activated silicates are used because they are chemically very stable while readily excited by the mercury radiation. However, a disadvantage of this type of luminescent material has been that, while it was possible to change the mainly green or yellow-green color of the emitted light of these luminescent materials toward the longer wave (yellow to yellow-red) portion of the spectrum, a considerable displacement of the wave lengths of the emitted light toward the short-wave part of the spectrum could not be obtained.

One object of my invention is to provide luminescent silicate materials which will emit blue to ultra-violet radiations when excited to luminescence by the radiations of a mercury-vapor discharge.

Another obect of my invention is to provide luminescent silicate materials which will emit radiations mainly in the range between 3000 to 4800 angstroms when excited to luminescence by the radiations of a mercury-vapor discharge.

The main feature of my invention is the use of cerium sesquioxide ($Ce_2O_3$) to activate the orthosilicates or metasilicates of aluminum, beryllium or magnesium, either by themselves or in mixtures. A further feature of my invention is the use of lead or bismuth as a second activator to increase the emission of such luminous materials. Still another feature of my invention is the addition of fluorides of the alkali-earth metals calcium, barium or strontium to such luminous materials for the purpose of facilitating the heating and homogenizing of the luminous material mixture, and also for the purpose of displacing the center of the light-emission band toward the short-wave side of the spectrum so as to lie at a value of approximately 3500 to 3600 angstroms.

Further objects and advantages of my invention will appear from the following description of species thereof.

It has been found that luminous silicate materials with a very strong blue to ultra-violet radiation can be obtained in a simple manner when, according to the invention, orthosilicates or metasilicates of aluminum, beryllium or magnesium either by themselves or in mixture, are activated with cerium sesquioxide ($Ce_2O_3$). For producing such luminescent materials, very pure silicic acids are mixed with very pure oxides of aluminum, beryllium or magnesium or mixtures thereof, while cerium-dioxide ($CeO_2$) or cerium salts or cerium-salt solutions are added. The silicic acid and oxides of aluminum, beryllium or magnesium are in this case used to advantage, in accordance with the formulas $3SiO_2$—$1Al_2O_3$ (metasilicate) and $3SiO_2$—$2Al_2O_3$ (orthosilicate) in a ratio of 3:1 or 3:2, while the ratio of the components does not need to correspond to the stoichiometric relations. The quantity of the added cerium-dioxide or the added cerium salts can fluctuate within wide limits, and may have a value up to 30 per cent by weight.

After the individual components have been intimately mixed, the mixture is fired at a temperature of approximately 1100 to 1300° C., preferably however at 1250° C., in a reducing atmosphere, preferably in very pure hydrogen, as a result of which the added cerium-dioxide or the added cerium salts are converted into cerium-sesquioxide. The time of firing as a rule is about ½ hour or more; it can, of course, be shorter at higher temperatures. The resulting compound, which is very much sintered together, is ground upon cooling and is then immediately ready for use.

The emission of the new luminescent materials according to the invention covers mainly the range from 3000 to 4800 angstroms, although there is still present an emission in the yellow spectral range which, however, is very weak. The center of the light-emission band of the luminous materials with a blue radiation lies at approximately 4000 angstroms. In addition to their application for changing the light color and for increasing the light yield of the mercury discharge, the luminous materials according to the invention can also be utilized where photochemically active rays are desired within the mentioned range. They can consequently be utilized to advantage for the conversion of the intensive short-wave line, 2537 angstroms, of the low-pressure mercury discharge into longer wave ultra-violet radiation.

It has been found that, in practice, a luminous effect can not be obtained when the cerium is present in the fused luminous material in the quadrivalent oxidation stage.

The emission of the new luminous materials can be increased by adding lead or bismuth as the second activator. The lead or the bismuth, in this case, is to be added in the form of salts or oxides in a quantity up to 3 per cent of the total mixture.

It is furthermore possible to add to the mixture a fluoride or fluorides of the alkali-earth metals calcium, barium or strontium; this can be done in quantities up to approximately 50 per cent. By such an admixture not only the sintering or melting, and consequently the homogenizing, of the luminous material mixture is facilitated, but at the same time a pronounced displacement of the light-emission band center toward the short-wave side of the spectrum is produced by a change in the absorption, so that the center of the band will then lie at a value of approximately 3500 to 3600 angstroms—depending on the additional fluoride that is used. The color of the emitted light in such case is not blue, but violet. If in addition to such a displacement of the band, an increase in the emission is simultaneously desired, then an admixture of lead or bismuth is to be used in addition to the admixture of a fluoride. Under certain circumstances, it suffices to use fluorides which are not chemically pure but to use those which contain a certain quantity of lead or impurities.

A few mixtures suitable for the production of aluminum silicate luminous materials with an admixture of cerium-sesquioxide, together with their emission range and the intensity of the luminous material after it is fired and ground, are given below.

| Composition | Range of emission | Intensity (arbitrary units) |
|---|---|---|
| 100 g. $Al_2O_3$<br>180 g. $SiO_2$<br>28 g. $CeO_2$ | Angstrom<br>3340–4800 | 134 |
| 100 g. $Al_2O_3$<br>180 g. $SiO_2$<br>3 g. PbO<br>28 g. $CeO_2$ | 3400–4800 | 214 |
| 100 g. $Al_2O_3$<br>180 g. $SiO_2$<br>3 g. PbO<br>28 g $CeO_2$<br>155 g. $CaF_2$ | 3030–4800 | 254 |

What I claim as new and desire to secure by Letters Patent of the United States is:

1. A luminescent substance highly responsive to radiation having a wave length of 2537 Angstrom units and highly emissive in the range of approximately 3000 to 4800 Angstrom units, said substance being a silicate of a metal of the group consisting of aluminum, beryllium and magnesium, activated by an addition of up to 30 per cent by weight of cerium sesquioxide.

2. A luminescent substance highly responsive to radiation having a wave length of 2537 Angstrom units and highly emissive in the range of approximately 3000 to 4800 Angstrom units, said substance being a silicate of a metal of the group consisting of aluminum, beryllium and magnesium, activated by an addition of cerium sesquioxide and a metal of the group consisting of lead and bismuth, said metal being added in the form of a suitable compound up to 3 per cent of the total mixture.

3. A luminescent substance highly responsive to radiation having a wave length of 2537 Angstrom units and highly emissive in the range of approximately 3000 to 4800 Angstrom units, said substance being a silicate of a metal of the group consisting of aluminum, beryllium and magnesium, activated by an addition of cerium sesquioxide and a metal of the group consisting of lead and bismuth, said metal being added in the form of suitable salts up to 3 per cent of the total mixture.

4. A luminescent substance highly responsive to radiation having a wave length of 2537 Angstrom units and highly emissive in the range of approximately 3000 to 4800 Angstrom units, said substance being a silicate of a metal of the group consisting of aluminum, beryllium and magnesium, activated by an addition of cerium sesquioxide and a metal of the group consisting of lead and bismuth, said metal being added in the form of oxides up to 3 per cent of the total mixture.

5. A luminescent substance highly responsive to radiation having a wave length of 2537 Angstrom units and highly emissive in the range of approximately 3000 to 4800 Angstrom units, said substance being a silicate of a metal of the group consisting of aluminum, beryllium, and magnesium, activated by an addition of cerium sesquioxide, and also containing an addition of up to approximately 50 per cent of a compound of the group consisting of the fluorides of calcium, barium and strontium.

GUNTHER ASCHERMANN.